United States Patent
Carrier et al.

(10) Patent No.: US 12,015,924 B2
(45) Date of Patent: Jun. 18, 2024

(54) MULTI-MCC CODE BUNDLE FOR USE IN INCREASING TRAVEL SECURITY

(71) Applicant: Bank of America Corporation, Charlotte, NC (US)

(72) Inventors: Nancy T. Carrier, Jacksonville, FL (US); Brandon Sloane, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 261 days.

(21) Appl. No.: 16/940,518

(22) Filed: Jul. 28, 2020

(65) Prior Publication Data

US 2022/0038890 A1 Feb. 3, 2022

(51) Int. Cl.
*H04W 12/60* (2021.01)
*G06N 5/04* (2023.01)
*G06N 20/00* (2019.01)
*H04W 12/06* (2021.01)

(52) U.S. Cl.
CPC .............. *H04W 12/60* (2021.01); *G06N 5/04* (2013.01); *G06N 20/00* (2019.01); *H04W 12/06* (2013.01)

(58) Field of Classification Search
CPC ...... H04W 12/60; H04W 12/06; G06N 20/00; G06N 5/04; G06Q 10/067
See application file for complete search history.

(56) References Cited

U.S. PATENT DOCUMENTS

| | | | | |
|---|---|---|---|---|
| 10,089,630 | B2* | 10/2018 | Clyne | G06Q 30/0255 |
| 11,099,024 | B2* | 8/2021 | Spears | G01C 21/3484 |
| 11,151,468 | B1* | 10/2021 | Chen | G06N 7/01 |
| 11,763,336 | B2* | 9/2023 | Tietzen | G06Q 30/0226 |
| | | | | 705/14.27 |
| 2013/0102283 | A1* | 4/2013 | Lau | G06Q 30/0269 |
| | | | | 455/411 |

(Continued)

OTHER PUBLICATIONS

Title: ollaborative Location-Based Sleep Schedulingfor Wireless Sensor Networks Integrated with Mobile Cloud Computing Author:Chunsheng Zhu, Student , Victor C. M. Leung, Laurence T. Yan ,and Lei Shu Date: 2015 Publisher: IEEE.*

(Continued)

*Primary Examiner* — Shahriar Zarrineh
*Assistant Examiner* — Gita Faramarzi
(74) *Attorney, Agent, or Firm* — Weiss & Arons LLP

(57) ABSTRACT

A proxy-based method for improving digital security during a user's travel is provided. The method may include determining a bundle of merchant category classification (MCC) codes. This bundle preferably reflects a baseline travel condition. The baseline travel condition is associated with a user mobile device. The method may also include dynamically updating a characteristic associated with the bundle of MCC codes based on updated travel conditions. The method may also include determining an occurrence of an anomalous user mobile device activity. The determination may be based on a comparison of the updated characteristic associated with the bundle of MCC codes and the baseline travel conditions; and in response to a determination of anomalous user mobile device activity, increasing a security level associated with the mobile device associated with the user.

11 Claims, 8 Drawing Sheets

(56) References Cited

U.S. PATENT DOCUMENTS

| | | | | |
|---|---|---|---|---|
| 2013/0144785 A1* | 6/2013 | Karpenko | ............ | G06Q 20/425 |
| | | | | 705/44 |
| 2016/0314464 A1* | 10/2016 | Carlson | .............. | G06Q 20/3224 |
| 2018/0174170 A1* | 6/2018 | Lo Faro | ............... | G06Q 10/067 |
| 2018/0276710 A1* | 9/2018 | Tietzen | .............. | G06Q 30/0269 |
| 2020/0394646 A1* | 12/2020 | Beye | .................. | G06Q 20/3224 |
| 2021/0227383 A1* | 7/2021 | Alameh | ................ | H04W 12/02 |

OTHER PUBLICATIONS

Title: The Messenger Shoots Back: Network Operator Based IMSI Catcher Detection Author: Adrian Dabrowski, Georg Petzl, and d Edgar R. Weippl Date: 2016 Publisher: Springer International Publishing.*

"The Known Traveller: Unlocking the Potential of Digital Identity for Secure and Seamless Travel," http://www3.weforum.org/docs/WEF_The_Known_Traveller_Digital_Identity_Concept.pdf, World Economic Forum, Jan. 2018.

"Travel Identity of the Future," https://www.sita.aero/resources/type/white-papers/travel-identity-of-the-future, SITA, 2016.

\* cited by examiner

MULTI-MCC CODE BUNDLE FOR USE IN INCREASING TRAVEL SECURITY

FIELD OF TECHNOLOGY

This disclosure relates to travel security.

BACKGROUND

When a person is travelling, his or her lifestyle patterns typically change. For example, his or her spending patterns may be different when away from home than his or her spending patterns when close to home.

Also during travel—the danger of compromise and/or breach of his or her personal information increases. The reasons for the decrease in security of personal information during travel may be attributable to several reasons such as use, by mobile devices associated with the traveler, of roaming networks, use, by mobile devices associated with the traveler, of foreign power devices and/or any other reason associated with travel away from home.

Decrease in security of personal information, and personal mobile devices, attributable to travel endangers a person in numerous ways. It could expose a person to bodily harm by exposing the person's travel plans. It could expose a person to financial harm by exposing a person's financial records and assets. It could expose a person to identify theft.

As such, there are many ways that exposure of a person's personal information, and mobile devices associated with the person, can endanger a person.

Accordingly, it is important to protect personal information, especially personal information associated with mobile devices, of a traveler.

Further, it would be desirable to provide systems and methods that mitigate the possibility of a breach of mobile device security.

It would be further desirable to provide systems and methods that mitigate the possibility of a breach of personal information.

It would be yet further desirable to use a baseline of legacy information, together with artificial intelligence (AI), to determine the current level of personal information security associated with a traveler.

SUMMARY OF THE DISCLOSURE

It is an object of the disclosure to provide systems and methods that mitigate the possibility of a breach of mobile device security.

It is a further object of the disclosure to provide systems and methods that mitigate the possibility of a breach of personal information.

It is a yet further object of the disclosure to use a baseline of legacy information, together with artificial intelligence (AI), to enhance the current level of personal information security associated with a traveler.

A proxy-based system for improving digital security during a user's travel is provided. The system may include a mobile device. The mobile device may be operative to perform transactions during the user's travel period of other electronic communications. Each of the transactions may relate to one or more of a plurality of representative merchant category classification (MCC) codes. The plurality of MCC codes preferably reflect a baseline user travel spend condition. The plurality serves as a proxy for travel spend using the mobile device.

The mobile device is preferably configured to update a spend magnitude of the plurality during a user travel period. The mobile device is preferably further configured to determine, based on the updated spend magnitude, whether an anomalous user spend magnitude has occurred. The anomalous user spend magnitude is preferably derived based on transactions associated with the user mobile device. The determination may be based at least in part on a comparison of the updated spend and a baseline user travel spend. In response to the determination of the occurrence of anomalous user spend magnitude associated with the mobile device, the mobile device may increase a security level associated with the mobile device. The security level may relate to the ability of the mobile device to perform transactions such as transferring funds, gaining entry to restricted locations on a travel itinerary, enabling a hotel stay, verifying an automobile rental, etc.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
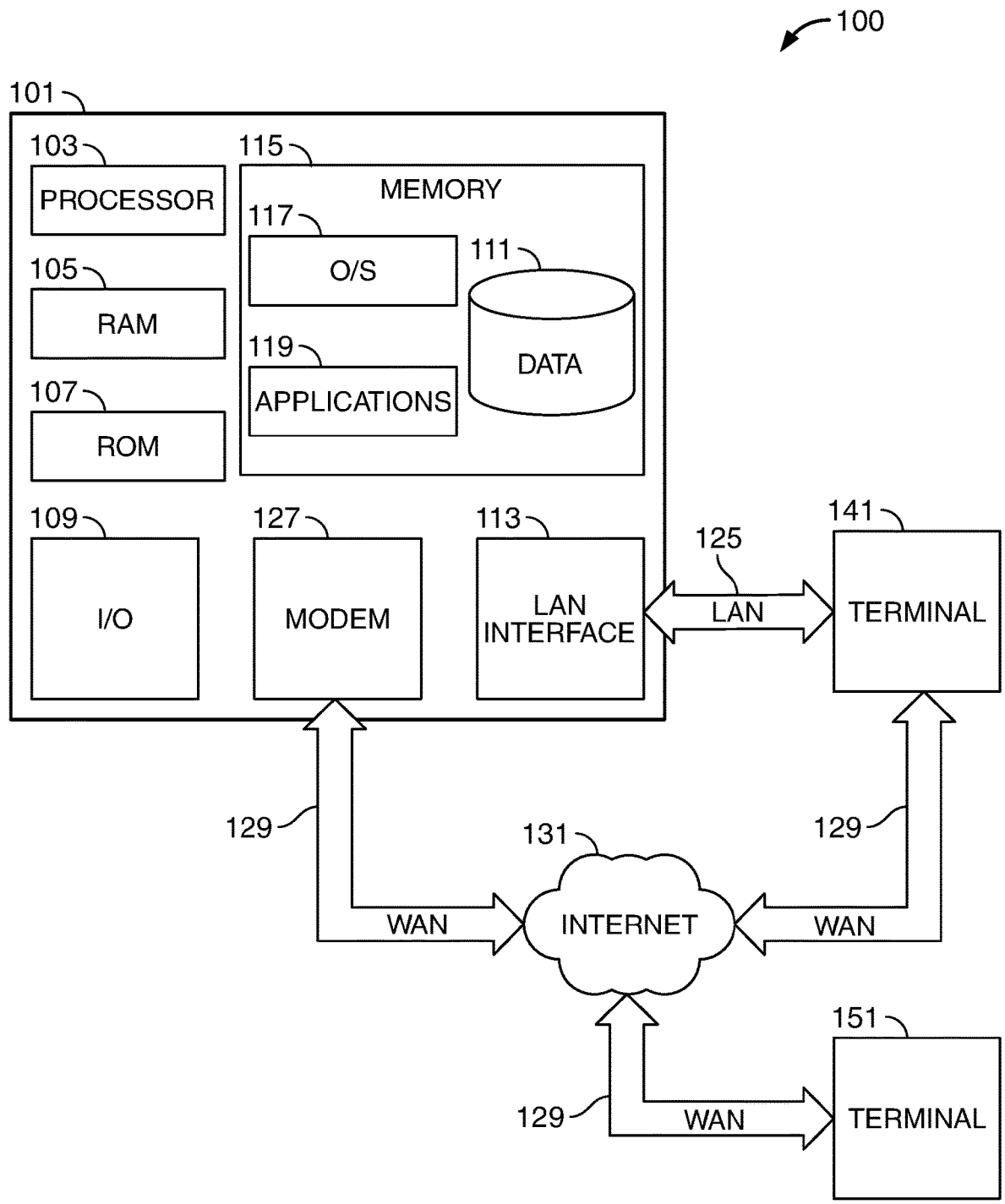
FIG. 1 shows an illustrative system in accordance with the principles of the disclosure.

A proxy-based method for improving digital security during a user's travel is provided. The method may include determining a bundle of merchant category classification (MCC) codes that reflects a user travel condition. The travel condition is associated with a user mobile device.

The method may include using the bundle to determine a stationary state of the device. The method may also include using the bundle to determine a travel state of the device.

When the device is in travel state, the method may include dynamically updating a characteristic associated with the bundle of MCC codes based on updated travel conditions. Such a characteristic may include the total spend associated with the bundle of MCC codes. For example, the bundle of MCC codes may include an MCC code for taxicabs and limousines (4121), airports and airport terminals (4582), direct marketing—travel related arrangements services (5962), and tourist attractions and exhibits (7991). Spend associated with such a bundle may reflect whether a user is currently traveling. Spend associated with such a bundle may reflect user behavior during travel. Updated spend associated with such a bundle may reflect changing user travel behavior. Updated spend associated with such a bundle may reflect fraudulent travel behavior—i.e., behavior associated with the user mobile device that is not associated with the user.

When the device is in travel state, the method may further include determining an occurrence of an anomalous user mobile device activity. This determination may be based at least in part on a comparison of the updated characteristic associated with the bundle of MCC codes and the characteristic at baseline travel conditions. In some embodiments, this determination may be based at least in part on a comparison of the updated characteristic associated with the bundle and the characteristic at baseline stationary conditions.

In response to a determination of anomalous user mobile device activity, the method may also include increasing a security level associated with the mobile device associated with the user.

In some embodiments, the travel state of the characteristic corresponds to legacy user travel spend.

In some embodiments, the updated characteristic may correspond to updated user travel spend.

Some embodiments of the method may include dynamically updating the plurality of MCC codes in the bundle of MCC codes. The updating may include updating based on verified travel conditions.

The increasing a security level described above may be associated with increasing a security level of the mobile device. Specifically, increasing a security level described above may include shifting the mobile device from single factor authorization to multifactor authorization.

In some embodiments, increasing a security level associated with the mobile device may include shifting the mobile device to a biometric authorization state. In some embodiments, increasing a security level associated with the mobile device may include shifting, at least partially, the mobile device to a biometric authorization state.

Certain embodiments of a proxy-based method for improving digital security during a user's travel may include the following. The method may include determining a bundle of merchant category classification (MCC) codes. The bundle preferably reflects, under certain mobile device conditions, a stationary user travel spend condition. The bundle reflects, under certain mobile device conditions, a user travel spend condition.

The stationary user travel spend and the user travel spend condition are preferably associated with the user mobile device.

During a user travel period, methods may include determining, using the bundle, whether an anomalous user spend magnitude has occurred. The anomalous user spend magnitude may have occurred based on transactions associated with the user mobile device. The determination may be based at least in part on a comparison of a current bundle condition and the user travel spend condition.

In response to the determination of the anomalous user spend magnitude associated with the mobile device, the methods may include increasing a security level associated with the mobile device.

In certain embodiments, the methods may include dynamically updating the bundle of MCC codes based on verified travel conditions.

The methods may also include increasing a security level associated with the mobile device by shifting the mobile device from single factor authorization to multifactor authorization or by shifting the mobile device to a biometric authorization state.

A proxy-based system for improving digital security during a user's travel is provided.

The system may include a mobile device. The mobile device may be operative to perform transactions during the user's travel period. Each of the transactions may form transactions that are included in a plurality of representative merchant category classification (MCC) codes. The plurality of MCC codes may preferably reflect a baseline user travel spend condition. The plurality may serve as a proxy for travel spend using the mobile device.

In some embodiments, the mobile device may be configured to update a spend magnitude of the plurality during a user travel period. The mobile device may preferably be configured to determine, based on the updated spend magnitude, whether an anomalous user spend magnitude has occurred.

The anomalous user spend magnitude may be derived based on transactions associated with the user mobile device. The determination may be based at least in part on a comparison of the updated spend and the baseline user travel spend.

In response to the determination of the occurrence of anomalous user spend magnitude associated with the mobile device, the mobile device may be configured to increase a security level associated with the mobile device.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input/output module may also include one or more speakers for providing audio output and a video display device for providing textual, audio, audiovisual, and/or graphical output. The input and output may be related to transaction resolution, authorization, and/or execution.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to transaction resolution, authorization, and/or execution.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
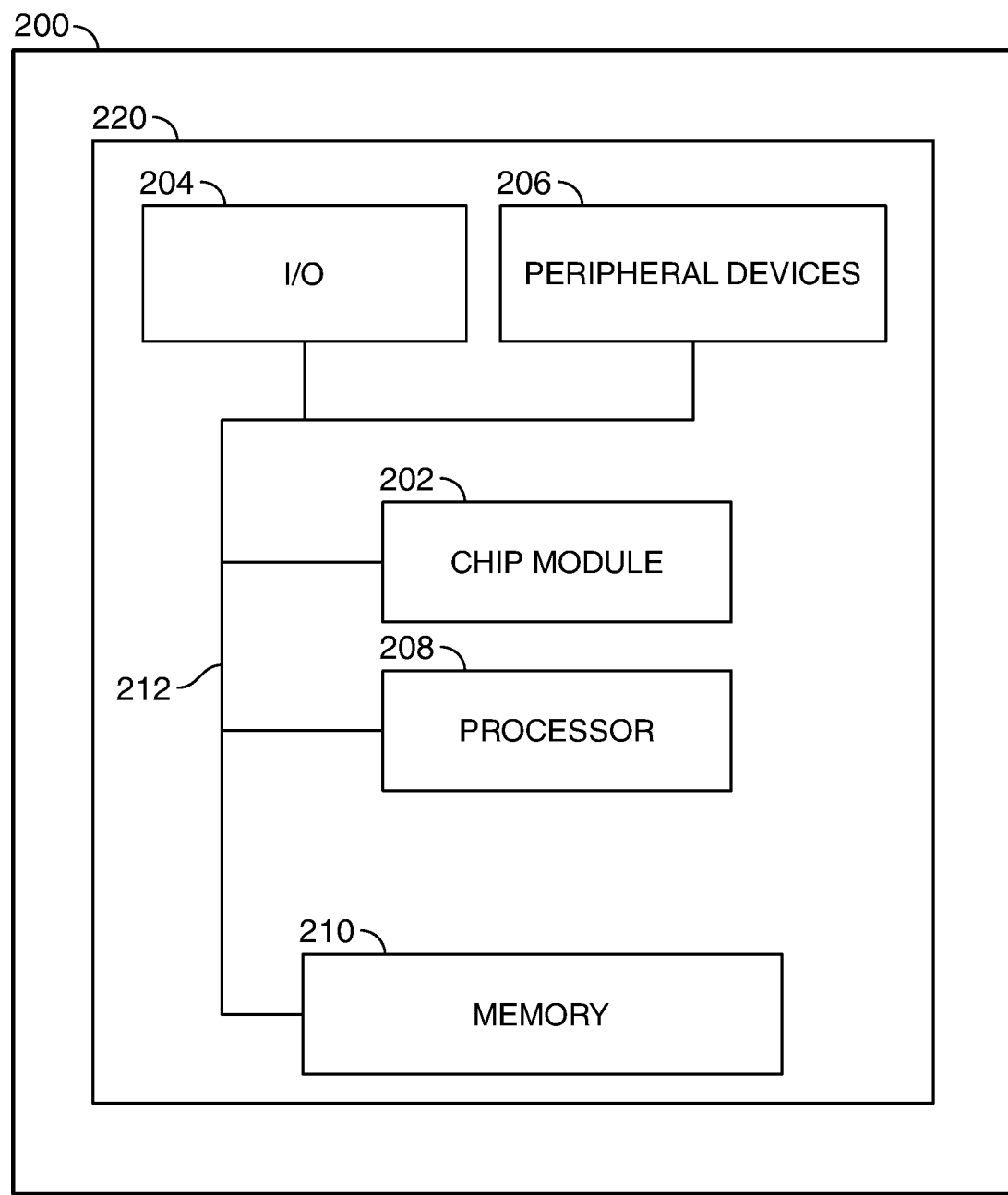
FIG. 2 shows an illustrative apparatus in accordance with the principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
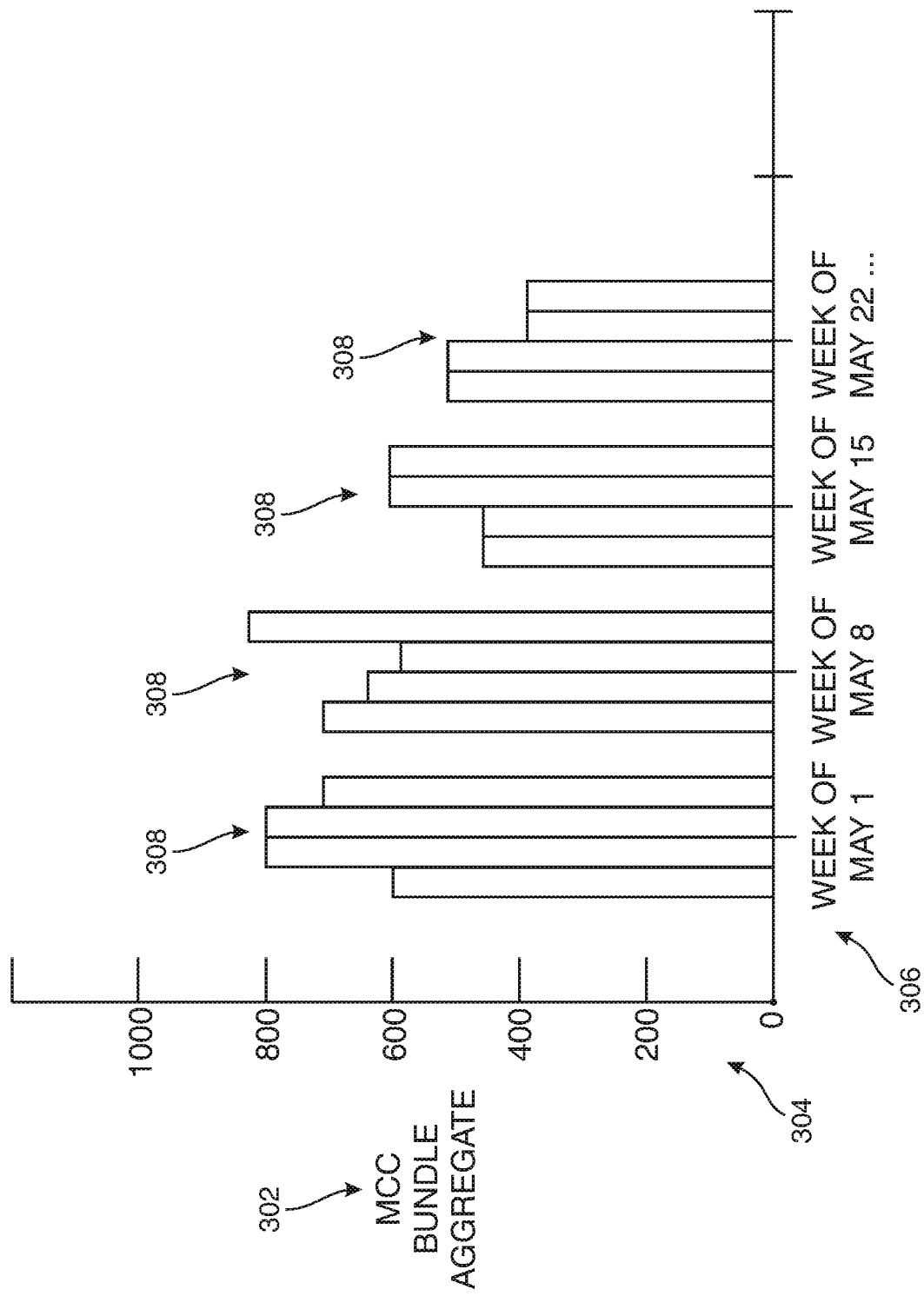
FIG. 3 is an illustrative, non-travel related, timing diagram in accordance with the principles of the disclosure.

FIG. 3 is an illustrative, non-travel related, timing diagram in accordance with the principles of the disclosure. FIG. 3 shows typical, non-travel, spend behavior associated with an aggregate of spending 302.

The aggregate of spending is associated with spending in four discrete MCC code areas 308.

The x-axis 306 shows that the spending is tabulated every week over a period of weeks. The y-axis 304 shows the amount of spend of each of the MCC codes over the four-week period shown in FIG. 3.

Figure 4:
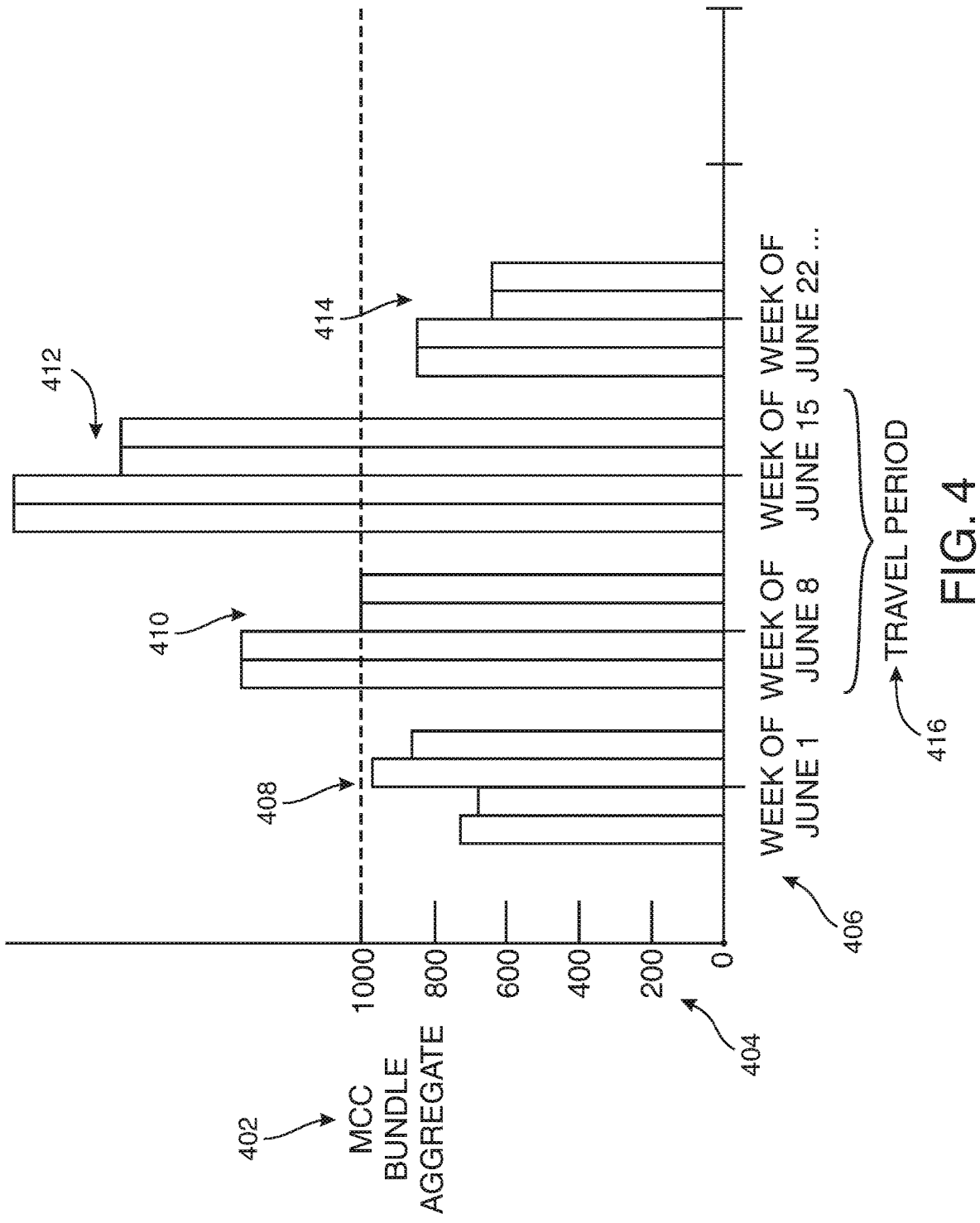
FIG. 4 is an illustrative timing diagram, including a travel period, in accordance with the principles of the disclosure.

FIG. 4 is an illustrative timing diagram, including a travel period, in accordance with the principles of the disclosure. FIG. 4 also shows spend dedicated to an MCC bundle aggregate 402.

The x-axis 406 shows that the spending is tabulated every week over a period of four (4) weeks. The y-axis 404 shows the amount of spend of each of the MCC codes over the four-week period shown in FIG. 4. It should be noted that x-axis 406 shows that the spending includes spending during a travel period 416.

During travel period 416, it is noteworthy that the spend associated with the MCC bundle traversed threshold 408. Specifically, each code of the MCC bundle traversed threshold 408 during the week of June 8, 410, and the week of June 15, at 412.

The fact that each member of the bundle in the week of June 8, 410, and each member of the bundle in the week of June 15, at 412, exceeds the threshold 408 indicates that the travel behavior occurred in the week of June 8, 410, and the week of June 15, at 412. Specifically, an increase in the magnitude of spend in each member of the MCC bundle corresponds to travel behavior associated with the user's travel activity.

Figure 5:
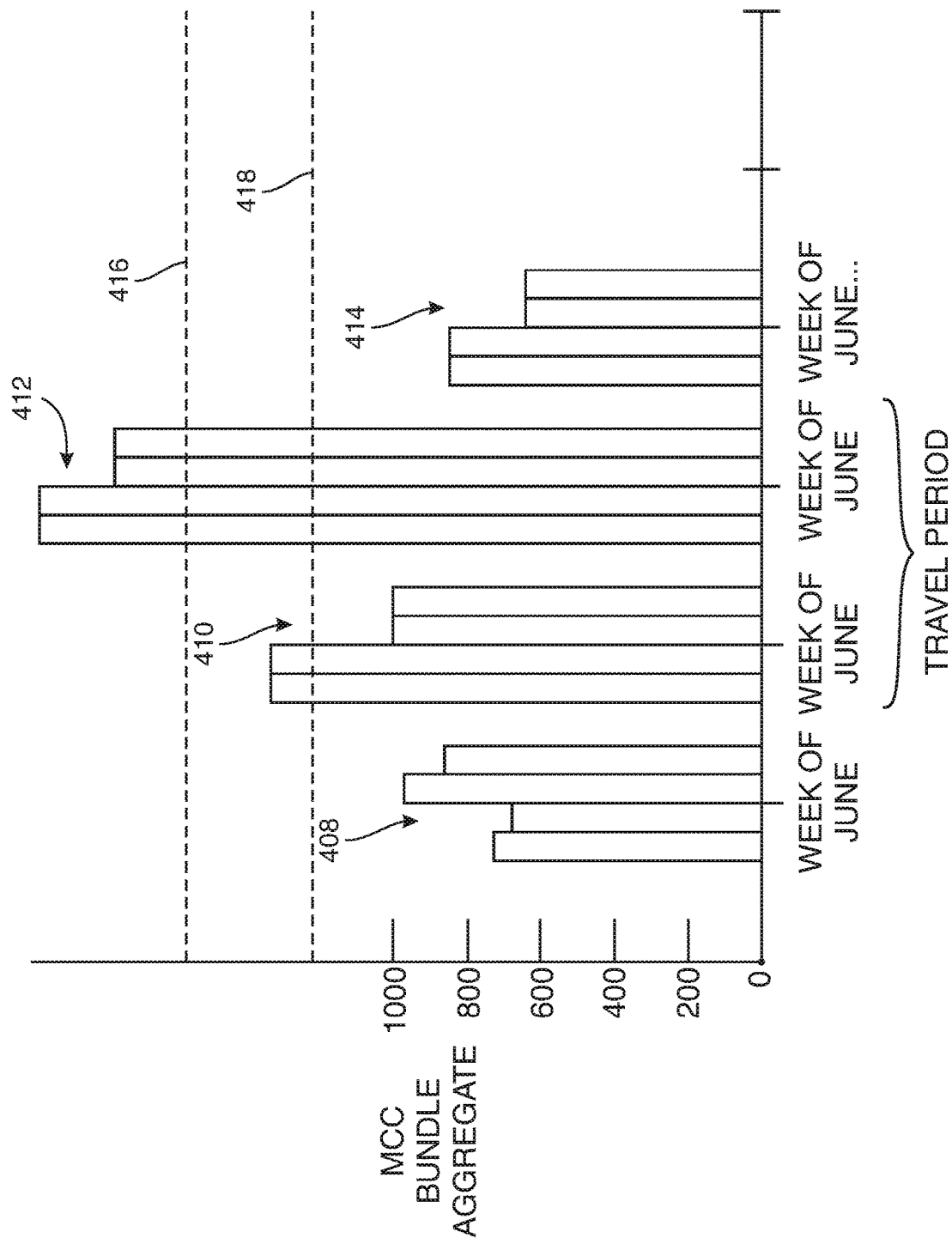
FIG. 5 is another illustrative timing diagram, including a travel period, in accordance with the principles of the disclosure.

FIG. 5 is another illustrative timing diagram, including a travel period, in accordance with the principles of the disclosure. Specifically, FIG. 5 shows yet another MCC bundle aggregate 502.

The week of July 1, shown in 508, corresponds to a non-travel period. The week of July 7, shown at 510, corresponds to a travel period. It is important to note that two of the members of the aggregate shown at 510 exceed threshold 518. As such, there is a high likelihood that the bundle of the week of July $7^{th}$ corresponds to a travel but does not correspond to an anomalous spend magnitude.

The week of July 15, 512, on the other hand, indicates that each member of the MCC bundle aggregate 502 exceeded threshold 516. Threshold 516 indicates an anomalous spend magnitude. Accordingly, each member of the MCC bundle aggregate 502 indicates anomalous spending magnitude and, as such, provides a proxy for an increase in security on the mobile device.

At the week of July 22, 514, spending has returned to non-travel levels. This may indicate that the anomalous spending levels shown in the week of July 15, 512, were more than likely associated with a security breach related to the travel conditions of the mobile device.

Figure 6:
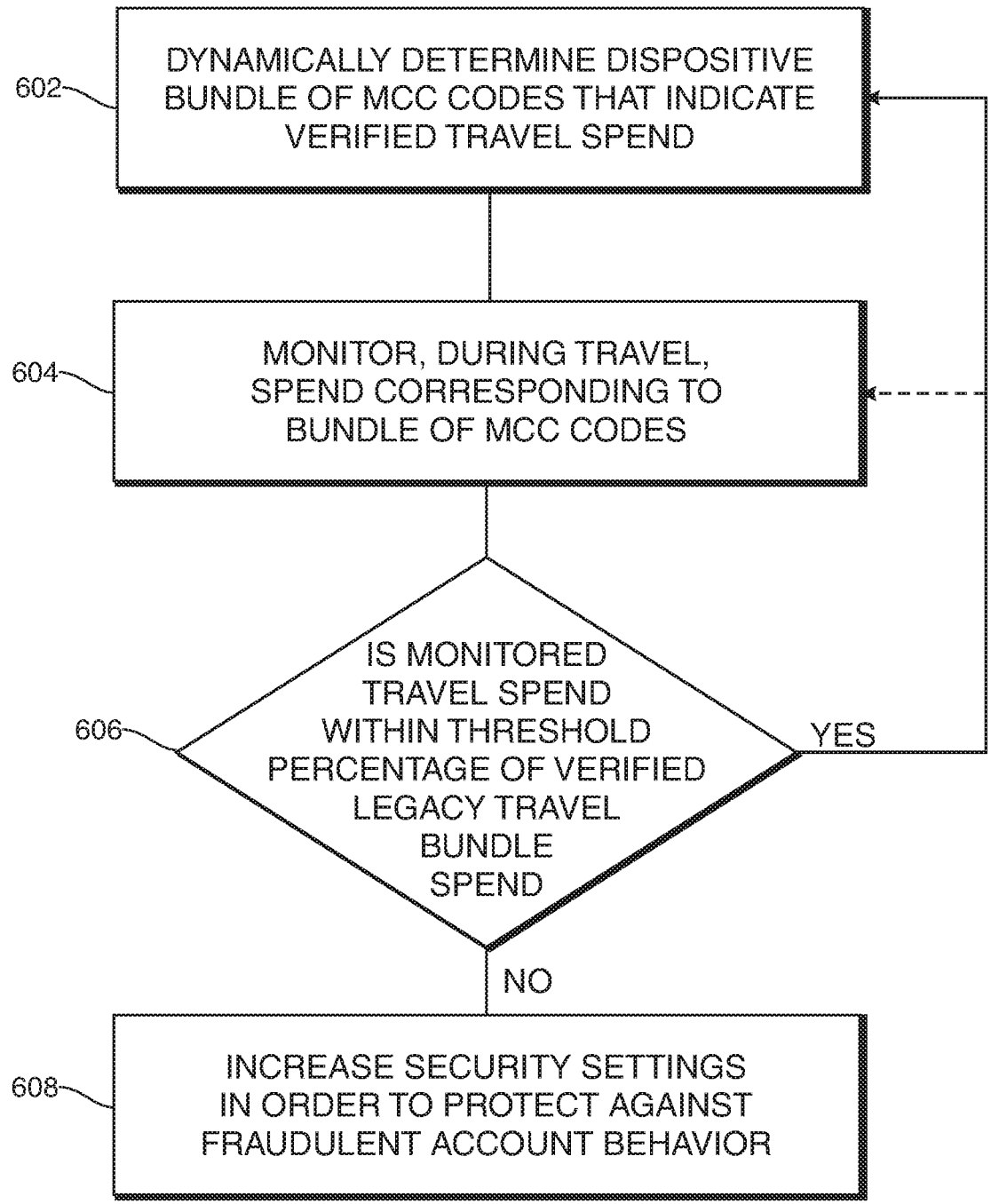
FIG. 6 is an illustrative flow diagram in accordance with the principles of the disclosure.

FIG. 6 is an illustrative flow diagram in accordance with the principles of the disclosure. Step 602 shows dynamically determining a dispositive bundle of MCC codes that indicates verified travel spend. Step 604 shows monitoring, during travel, spend corresponding to the bundle of MCC codes.

Step 606 shows querying whether the spend associated with each code of the monitored travel spend bundle is within a threshold percentage of verified legacy travel spend. If each spend associated with each code is within the threshold percentage of the verified legacy travel spend then the application returns to step 602.

If each spend associated with each code is not within the threshold percentage of the verified legacy travel spend then the application continues to step 608—which involves increasing security settings associated with the mobile device in order to protect against fraudulent account behavior.

Figure 7:
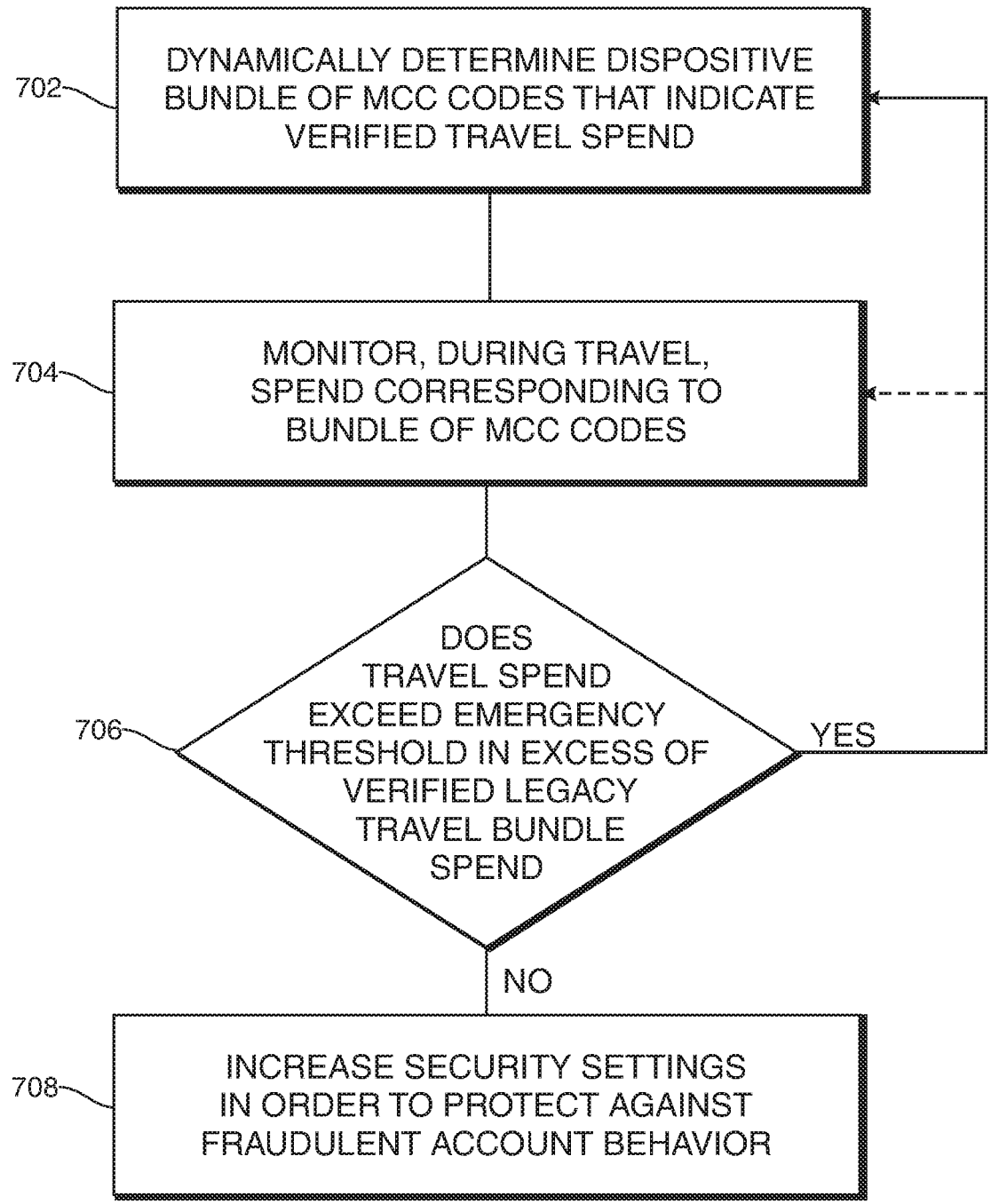
FIG. 7 is another illustrative flow diagram in accordance with the principles of the disclosure.

FIG. 7 is another illustrative flow diagram in accordance with the principles of the disclosure. Step 702 shows dynamically determining a dispositive bundle of MCC codes that indicates verified travel spend. Step 704 shows monitoring, during travel, spend corresponding to the bundle of MCC codes.

Step 706 shows querying whether the spend associated with each code of the monitored travel spend bundle (or the bundle as a whole) exceeds an emergency threshold percentage of verified legacy travel spend. If each spend associated with each code does not exceed the emergency threshold then the application returns to step 702.

If one or more spend(s) or the spend of the bundle, associated with each code does exceed the emergency threshold then the application continues to step 608—which involves an immediate shutdown of the mobile device, or at least terminating the ability of the mobile device to perform transactions, and/or increasing security settings associated with the mobile device in order to protect against fraudulent account behavior.

Figure 8:
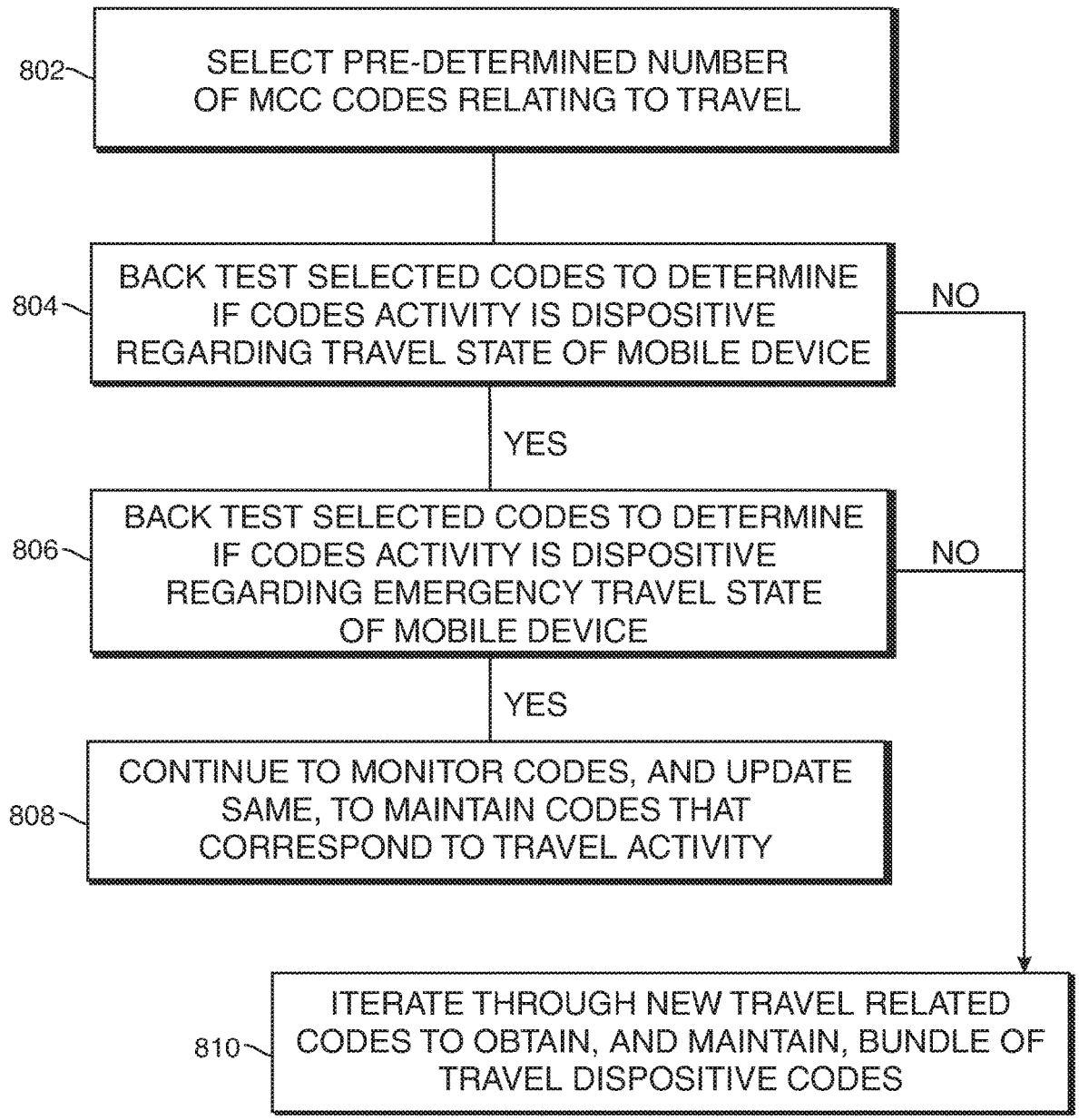
FIG. 8 is an illustrative flow diagram of an artificial intelligence (A/I) algorithm that may be used in accordance with the principles of the disclosure.

FIG. 8 is an illustrative flow diagram of an artificial intelligence (A/I) algorithm that may be used in accordance with the principles of the disclosure.

Step 802 shows selecting a pre-determined number of MCC codes relating to travel. Step 804 shows back-testing—i.e., testing historical activity associated with the mobile device to determine whether the MCC codes dispositively indicated the travel state of the mobile device.

Step 806 shows back-testing selected codes to determine if the codes activity is dispositive of an emergency travel state of the mobile device—i.e., did the selected bundle of codes indicate whether an emergency state (such as a fraudulent occurrence) occurred during a travel state associated with the mobile device.

Step 808 shows that if the codes were dispositive of both a travel state and/or a travel emergency state, then the system continues to monitor codes, and update same, in order to maintain selected codes that correspond to travel activity.

Step 810 shows that if the selected codes were not dispositive of both a travel state and/or a travel emergency state, then the system may preferably iterate through new travel related codes to obtain, and then maintain, a bundle of travel dispositive codes.

In certain embodiments, the updating in step 808 may include continually, or periodically, testing the bundle of codes to determine whether the codes continue to perform as desired—i.e., are the codes continuing to provide a dispositive indication of the travel state of the mobile device and/or are codes continuing to provide a dispositive indication of the emergency travel state associated with the device.

Thus, systems and methods involving code bundles for use in performing proxy functions in increasing mobile device travel security settings have been provided. Persons skilled in the art will appreciate that the present invention can be practiced by other than the described embodiments, which are presented for purposes of illustration rather than of limitation.

What is claimed is:

1. A proxy-based method for improving digital security during a user's travel, the method comprising:
    determining a bundle of merchant category classification (MCC) codes that reflects a user travel condition, said travel condition associated with a user mobile device;
    using the bundle to determine a stationary state of the user mobile device;
    using the bundle to determine a travel state of the user mobile device;
    when the user mobile device is in the travel state, dynamically updating a characteristic associated with the bundle of MCC codes based on updated travel conditions;
    when the device is in the travel state, determining an occurrence of an anomalous user mobile device activity, said determination being based at least in part on comparison of the updated characteristic associated with the bundle of MCC codes and the user travel condition;
    in response to a determination of anomalous user mobile device activity, increasing a security level associated with the user mobile device associated with the user;
    testing the bundle by testing historical activity associated with the mobile device to determine whether the bundle of MCC codes dispositively indicated the travel state of the mobile device;
    testing the bundle to determine if the bundle is dispositive regarding an emergency travel state of the mobile device by testing whether the bundle of MCC codes indicated that the emergency travel state occurred during a travel state associated with the mobile device;
    monitoring the bundle, and updating the bundle to maintain codes within the bundle that correspond to travel activity, said monitoring the bundle further comprising determining whether to shift the mobile device from single factor authorization to multifactor authorization; and
    iterating through travel related codes not currently in the bundle to obtain, and maintain, the bundle;
    wherein the dynamically updating the characteristic comprises dynamically updating the bundle of MCC codes based on verified travel conditions.

2. The method of claim 1, wherein the travel state of the characteristic corresponds to legacy user travel spend.

3. The method of claim 1, wherein the updated characteristic corresponds to updated user travel spend.

4. The method of claim 1, wherein the increasing a security level associated with the mobile device comprises shifting the mobile device from single factor authorization to multifactor authorization.

5. The method of claim 1, wherein the increasing a security level associated with the mobile device comprises shifting the mobile device to a biometric authorization state.

6. A proxy-based method for improving digital security during a user's travel, the method comprising:
    using the bundle to determine a travel state of a mobile device;
    determining a bundle of merchant category classification (MCC) codes, the bundle that reflects a stationary user travel spend condition and that reflect a user travel spend condition, said stationary user travel spend and said user travel spend condition associated with a user mobile device;
    during a user travel period, determining, using the bundle, whether an anomalous user spend magnitude has occurred, said anomalous user spend magnitude having occurred based on transactions associated with the user mobile device, said determination based at least in part on comparison of a current bundle condition and the user travel spend condition;
    in response to the determination of the anomalous user spend magnitude associated with the user mobile device, increasing a security level associated with the user mobile device;
    testing the plurality of MCC codes by testing historical activity associated with the mobile device to determine whether the plurality of MCC codes dispositively indicated the travel state of the mobile device;
    testing the plurality of MCC codes to determine if plurality of MCC codes is dispositive regarding an emergency travel state of the mobile device by testing whether the plurality of MCC codes indicated that the emergency travel state occurred during a travel state associated with the mobile device;
    monitoring the plurality of MCC codes, and updating the plurality of MCC codes to maintain codes within the plurality of MCC codes that correspond to travel activity, said monitoring the bundle further comprising determining whether to shift the mobile device from single factor authorization to multifactor authorization; and
    iterating through travel related codes not currently in the bundle to obtain, and maintain, the bundle; and
    dynamically updating the bundle of MCC codes based on verified travel conditions.

7. The method of claim 6, wherein the increasing a security level associated with the mobile device comprises shifting the mobile device from single factor authorization to multifactor authorization.

8. The method of claim 6, wherein the increasing a security level associated with the user mobile device comprises shifting the mobile device to a biometric authorization state.

9. A proxy-based system for improving digital security during a user's travel, the system comprising:
    a mobile device, the mobile device operative to perform transactions during the user's travel period, each of the transactions that are included in a plurality of representative merchant category classification (MCC) codes, the plurality of MCC codes that reflect a baseline user travel spend condition, the plurality that serve as a proxy for travel spend using the mobile device;
    using the plurality of MCC codes to determine a travel state of the mobile device;
    wherein the mobile device is configured to update a spend magnitude of the plurality during a user travel period;
    wherein the mobile device is configured to determine, based on the updated spend magnitude, whether an anomalous user spend magnitude has occurred, said anomalous user spend magnitude having been derived based on transactions associated with the user mobile device, said determination based at least in part on a comparison of the updated spend and the baseline user travel spend; and in response to the determination of the occurrence of anomalous user spend magnitude associated with the mobile device, the mobile device is configured to increase a security level associated with the mobile device;

testing the plurality of MCC codes by testing historical activity associated with the mobile device to determine whether the plurality of MCC codes dispositively indicated the travel state of the mobile device;

testing the plurality of MCC codes to determine if the plurality of MCC codes is dispositive regarding an emergency travel state of the mobile device by testing whether the plurality of MCC codes indicated that the emergency travel state occurred during a travel state associated with the mobile device;

monitoring the plurality of MCC codes, and updating the plurality of MCC codes to maintain codes within the plurality of MCC codes that correspond to travel activity, said monitoring the bundle further comprising determining whether to shift the mobile device from single factor authorization to multifactor authorization; and iterating through travel related codes not currently in the plurality of MCC codes to obtain, and maintain, the plurality of MCC codes;

wherein the mobile device is further configured to dynamically update the plurality of MCC codes based on verified travel conditions.

10. The method of claim 9, wherein the increase in the security level associated with the mobile device comprises a shift from single factor authorization to multifactor authorization.

11. The method of claim 9, wherein the increase in the security level associated with the mobile device comprises a shift from single factor authorization to a biometric authorization state.

* * * * *